(12) United States Patent  
Serra et al.

(10) Patent No.: US 6,658,340 B2
(45) Date of Patent: Dec. 2, 2003

(54) METHOD OF UPDATING THE TRANSMISSIBILITY FUNCTION OF A CLUTCH DURING A GEAR CHANGE

(75) Inventors: Gabriele Serra, S. Lazzaro di Savena (IT); Antonino Aronica, Turin (IT); Francesco Cimmino, Turin (IT)

(73) Assignee: Magneti Marelli Powertrain, S.p.A. (IT)

( * ) Notice: Subject to any disclaimer, the term of this patent is extended or adjusted under 35 U.S.C. 154(b) by 94 days.

(21) Appl. No.: 09/983,756

(22) Filed: Oct. 25, 2001

(65) Prior Publication Data

US 2002/0072450 A1 Jun. 13, 2002

(30) Foreign Application Priority Data

Oct. 27, 2000 (IT) ...................................... BO2000A0628

(51) Int. Cl.$^7$ .............................................. G06F 17/00
(52) U.S. Cl. ............................. 701/67; 701/63; 701/68
(58) Field of Search ............................. 701/67, 34, 63, 701/68; 477/39, 54, 57, 70, 74, 77; 192/85 R, 91 R

(56) References Cited

U.S. PATENT DOCUMENTS 5,908,406 A * 6/1999 Ostapchenko et al. ... 604/96.01

6,151,544 A * 11/2000 Amisano et al. ............. 701/67

FOREIGN PATENT DOCUMENTS

| DE | 19540921 | 5/1997 |
|---|---|---|
| DE | 19812629 | 9/1999 |
| EP | 0821178 | 1/1998 |

\* cited by examiner

*Primary Examiner*—Marthe Y. Marc-Coleman
(74) *Attorney, Agent, or Firm*—Hall, Priddy, Myers & Vande Sande

(57) ABSTRACT

A method of updating the transmissibility function of a clutch during the final stage of a gear change, in which the clutch is closed to cause the angular speed of the drive shaft to equal the angular speed of the primary shaft of the gear change, the engine is set to supply a constant torque, the clutch is disposed in a predetermined position in order to transmit a constant torque greater than the torque supplied by the engine and the actual value of the torque transmitted by the clutch is calculated by subtracting the product of the moment of inertia of the engine and the angular acceleration of the drive shaft from the torque generated by the engine, the actual value of the torque transmitted by the clutch then being used to update the transmissibility function of the clutch.

9 Claims, 1 Drawing Sheet

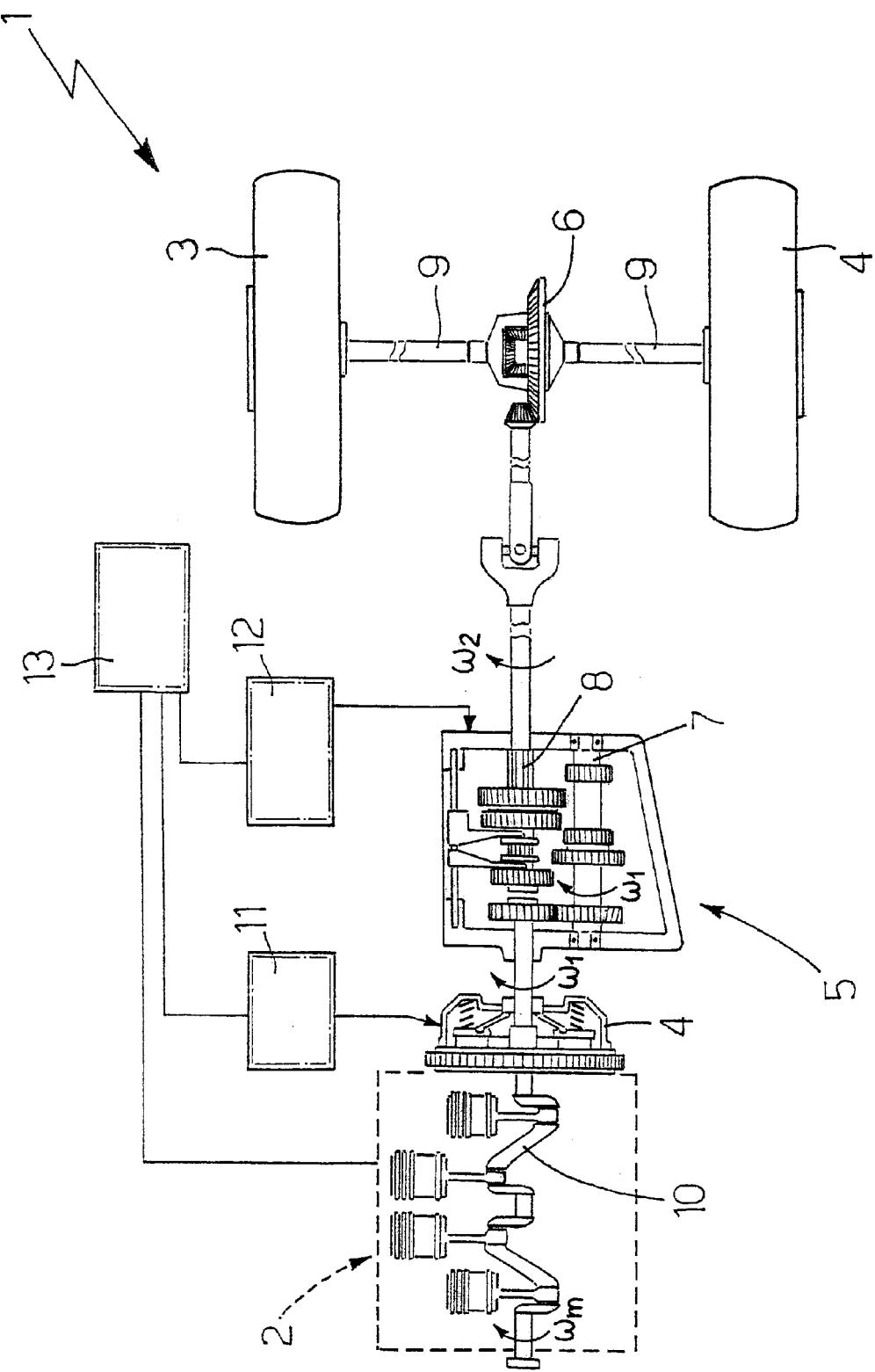

METHOD OF UPDATING THE TRANSMISSIBILITY FUNCTION OF A CLUTCH DURING A GEAR CHANGE

The present invention relates to a method for updating the transmissibility function of a clutch during a gear change, and in particular a gear change performed by a servo-controlled manual gear change to which the following description will make explicit reference without detriment to its general nature.

BACKGROUND OF THE INVENTION

Servo-controlled manual gear changes are increasingly widespread and, from a structural point of view, are entirely similar to a conventional manual gear change except for the fact that the control pedals and levers that can be actuated by the driver are replaced by corresponding electrical or hydraulic servo-controls. When using a servo-controlled manual gear change, the driver merely has to send a command to a control unit to change to a higher or a lower gear and the control unit independently performs the gear change by acting on the control of the butterfly valve and on the various servo-controls.

For the correct management of the gear change operations, the control unit normally uses the transmissibility function of the clutch, i.e. the bi-univocal function that associates each position of the clutch (clutch position determined by a hydraulic or electric actuator controlled by the control unit) with a respective torque value transmitted by the clutch between the drive shaft and the primary shaft of the gear change.

The transmissibility function of a new clutch may be readily determined with a high degree of accuracy by simple experimental tests; however, the transmissibility function undergoes continuous change as a result of the wear of the clutch. If it is to be used, therefore, the transmissibility function of the clutch must be continuously updated during the use of the vehicle so as to take account of the changes continuously taking place in the clutch.

A number of methods have been proposed for updating the transmissibility function of a clutch during the normal use of the vehicle, in order to enable a continuous updating of the transmissibility function stored in a memory of the control unit of the vehicle. More particularly, the known methods of updating the transmissibility function of a clutch during the normal use of the vehicle, of the type disclosed in Italian Patent Application TO97A000086 filed on Feb. 4, 1997, entail the determination of this transmissibility function during a clutch actuation at the vehicle starting stage.

Using the known methods of the type described above, however, the correct determination of the transmissibility function is scarcely repeatable as it can be performed only when particular favourable conditions are present and, therefore, not during any vehicle starting stage. The fact that the determination of the transmissibility function is scarcely repeatable is a particular drawback as the updating has to take place less frequently and it is difficult to apply filtering operations to the results obtained to eliminate drifts due to noise. Moreover, the accuracy with which the transmissibility function is determined using the known methods described above is relatively low and not always able to satisfy the requirements of the control logics used in modern servo-controlled manual gear changes.

SUMMARY OF THE INVENTION

The object of the present invention is to provide a method of updating the transmissibility function of a clutch during a gear change, which is free from the drawbacks described above and which can, in particular, be readily and economically embodied.

The present invention therefore relates to a method of updating the transmissibility function of a clutch during a gear change as set out in claim 1.

BRIEF DESCRIPTION OF THE DRAWING

The present invention will be described below with reference to the accompanying drawing, which shows a non-limiting embodiment thereof, in which the FIGURE is a diagrammatic view of the engine and transmission members of a vehicle provided with a servo-assisted manual gear change.

DETAILED DESCRIPTION OF THE INVENTION

In FIG. 1, the transmission members of a known vehicle are shown overall by 1 and are adapted to transmit motion from an engine 2 to a pair of drive wheels 3. The transmission members 1 comprise a clutch 4, a servo-controlled manual gear change 5 and a differential 6; the gear change 5 in turn comprises a primary shaft 7 which rotates at an angular speed $\omega_1(t)$, and a secondary shaft 8 which rotates at an angular speed $\omega_2(t)$ and transmits movement to the drive wheels 3 by means of the differential 6 and a pair of axle shafts 9. By means of the interposition of the clutch 4, the primary shaft 7 is connected to a drive shaft 10 which is caused to rotate by the engine 2 and rotates at an angular speed $\omega_m(t)$.

The transmission members 1 further comprise a hydraulic or electro-hydraulic servo-control 11 of known type which is adapted to control the clutch 4, and a hydraulic or electro-hydraulic servo-control 12 of known type which is adapted to control the position of the secondary shaft 8 in order to determine the transmission ratio existing between the primary shaft 7 and the secondary shaft 8. The servo-controls 11 and 12 are controlled by a control unit 13 which is connected to a series of sensors (known and not shown) detecting commands from the driver and measuring the value of some reference magnitudes of the engine 2 and the transmission members 1.

A respective memory (known and not shown) in the control unit 13 stores the transmissibility function $T_{cl}(x)$ of the clutch 4, which provides, for each position x of the clutch 4 (or rather for each position x of the pressure plate of the clutch 4), the torque $T_{cl}$ transmitted by means of the clutch 4 from the drive shaft 10 to the primary shaft 7 of the gear change 5. In general, the transmissibility function $T_{cl}(x)$ of the clutch 4 may be obtained from equation [0] in which F(x) is the force exerted by the pressure plate of the clutch 4, $\mu$ is the coefficient of friction between the discs of the clutch 4 and SIGN ( ) is a binary sign function and assumes the value ±1 depending on whether the angular speed $\omega_m(t)$ of the drive shaft 10 is higher or lower than the angular speed $\omega_1(t)$ of the primary shaft 7.

$$T_{cl}(x)=F(x)*\mu*SIGN(\omega_m(t)-\omega_1(t)) \qquad [0]$$

In general, wear and temperature variations affect both the coefficient $\mu$ of friction between the discs of the clutch 4 and the force F(x) exerted by the pressure plate of the clutch 4.

During a gear change from a current gear A to a subsequent gear B, the control unit 13 controls the servo-controls 11 and 12 in order to open the clutch 4, to disengage the gear A, to engage the gear B and lastly to reclose the clutch 4.

During the above-mentioned gear change operations, the control unit 13 keeps the drive torque $T_m$ generated by the engine 2 constantly under control in order to maintain the angular speed $\omega_m(t)$ of the drive shaft 10 substantially equal to the desired values.

During the stage of reclosure of the clutch 4 after engaging the gear B, the angular speed $\omega_m(t)$ of the drive shaft 10 is caused to equal the angular speed $\omega_1(t)$ of the primary shaft 7, this angular speed $\omega_1(t)$ being imposed by the speed of the vehicle since the primary shaft 7 is angularly rigid with the drive wheels 3 via the axle shafts 9, the differential 6, the secondary shaft 8 and the gearing of the gear B. During the stage of reclosure of the clutch 4, the clutch 4 is sliding and transmits a torque $T_{cl}$ between the drive shaft 10 and the primary shaft 7; in this situation, the law of motion is given by equation [1] in which $J_m$ represents the moment of inertia of the engine 2 and $\omega'_m(t)$ the time derivative of the angular speed $\omega_m(t)$ of the drive shaft 10, i.e. the angular acceleration of the drive shaft 10.

$$J_m * \omega'_m(t) = T_m(t) - T_{cl}(t) \quad [1]$$

Two further equations derive directly from equation [1]:

$$\omega'_m(t) = (T_m(t) - T_{cl}(t))/J_m \quad [2]$$

$$T_{cl}(t) = T_m(t) - J_m * \omega'_m(t) \quad [3]$$

It will be appreciated from equation [3] that it is possible to calculate the torque $T_{cl}$, transmitted by the clutch 4 when the drive torque $T_m$ generated by the engine 2 is known, which torque $T_m$ can be obtained in a known manner from the operating parameters of the engine 2, when the moment of inertia $J_m$ of the engine 2 is known, which moment $J_m$ is constant and can be readily obtained, and when the angular acceleration $\omega'_m(t)$ of the drive shaft 10 is known, which acceleration $\omega'_m(t)$ can be calculated simply from the observation of the angular speed $\omega_m(t)$ of the drive shaft 10.

As the position of the clutch 4 is known as it is determined by the servo-control 11, by applying equation [3] it is possible to calculate the value of the torque $T_{cl}$ actually transmitted by the clutch 4 in this position.

During the stage of reclosure of the clutch 4 after engagement of the gear B, the purpose of the control unit 13 is to cause the angular speed $\omega_m(t)$ of the drive shaft 10 to be equal to the angular speed $\omega_1(t)$ of the primary shaft 7, i.e. to provide the drive shaft 10 with an angular acceleration $\omega'_m(t)$ which is not zero (positive or negative depending on whether the drive shaft 10 is slower or faster than the primary shaft 7). As shown by equation [1], in order to provide the drive shaft 10 with an angular acceleration $\omega'_m(t)$ which is not zero, the control unit 13 has two degrees of freedom, i.e. two independent variables to be controlled: the torque $T_{cl}$ transmitted by the clutch 4 and the drive torque $T_m$ generated by the engine 2.

In order to ensure optimum conditions for accurately determining the value of the torque $T_{cl}$ actually transmitted by the clutch 4 at a given position of this clutch 4, and therefore to make it possible to update the transmissibility function $T_{cl}(x)$ of the clutch 4, the control unit 13 sets the engine 2 to generate a constant drive torque $T_m$ (for instance a drive torque $T_m$ of mere maintenance, i.e. zero from the point of view of the clutch 4) and at the same time controls the servo-control 11 to dispose the clutch 4 in a fixed position so that the torque $T_{cl}$ transmitted by the clutch 4 has a predetermined fixed value greater than that supplied by the engine. This makes it possible to obtain an increase or a decrease (depending on whether the drive shaft 10 is slower or faster than the primary shaft 7) of the angular speed $\omega_m(t)$ of the drive shaft 10. This increase or decrease will in any case be constant as it is determined by a constant angular acceleration $\omega'_m(t)$ as shown by equation [2] in which all the terms to the right of the equal sign are constant.

The fact that the angular acceleration $\omega'_m(t)$ is maintained constant in a certain time interval makes it possible to calculate this angular acceleration $\omega'_m(t)$ simply and with a high degree of accuracy from the observation of the angular speed $\omega_m(t)$ of the drive shaft 10. In this way, the actual value of the torque $T_{cl}$ transmitted by the clutch 4 may also be accurately calculated by applying equation [3].

According to a different embodiment, in order to calculate the actual value of the torque $T_{cl}$ transmitted by the clutch 4, all supply to the engine 2 is discontinued in order to prevent any working torque from being generated, and the drive torque $T_m$ is therefore negative and will depend solely on the internal friction torques of the engine 2, whose value can be readily calculated with a relatively high degree of accuracy.

It will be appreciated from the above that the calculation of the actual value of the torque $T_{cl}$ transmitted by the clutch 4 in a given position of this clutch 4 is simple and generally highly accurate, as the use of equation [3] involves only physical magnitudes of the engine 2.

Once the actual value of the torque $T_{cl}$ transmitted by the clutch 4 has been obtained, it is compared with the value obtained from the transmissibility function $T_{cl}(x)$ stored in the control unit 13 in order to calculate an index of "degradation" due to the variations over time of the mechanical properties of the clutch 4. The degradation index obtained is then filtered, taking account of the degradation indices obtained from previous calculation stages, and used to update the transmissibility function $T_{cl}(x)$ of the clutch 4.

What is claimed is:

1. A method of updating a transmissibility function ($T_{cl}$(x)) of a clutch during a final stage of a gear change, in which said clutch is closed to cause an angular speed ($\omega_m$) of a drive shaft to equal an angular speed ($\omega_1$) of a primary shaft of a transmission (5), in which method an actual value of torque ($T_{cl}$) transmitted by said clutch is calculated by subtracting a product of a moment of inertia ($J_m$) of an engine and an angular acceleration ($\omega'_m$) of said drive shaft from torque ($T_m$) generated by said engine said actual value of said torque ($T_{cl}$) actually transmitted by said clutch being used to update said transmissibility function ($T_{cl}(x)$) of said clutch; and in which an index of a degradation of said transmissibility function ($T_{cl}(x)$) is calculated by comparing said actual value of said torque ($T_{cl}$) transmitted by said clutch with an equivalent theoretical value of said torque ($T_{cl}$) transmitted by said clutch obtained from said transmissibility function ($T_{cl}(x)$).

2. A method as claimed in claim 1, characterized in that in order to calculate said actual value of said torque ($T_{cl}$) transmitted by said clutch, said clutch is disposed in a predetermined position in order to transmit a constant torque ($T_{cl}$).

3. A method as claimed in claim 2, characterized in that in order to calculate said actual value of said torque ($T_{cl}$) transmitted by said clutch, said clutch is disposed in a predetermined position in order to transmit a constant torque ($T_{cl}$) greater than said torque ($T_m$) supplied by said engine.

4. A method as claimed in claim 1, characterized in that in order to calculate said actual value of said torque ($T_{cl}$) transmitted by said clutch, said engine is set to supply a constant torque ($T_m$).

5. A method as claimed in claim 4, characterized in that in order to calculate said actual value of said the torque ($T_{cl}$)

transmitted by said clutch, a supply to said engine is discontinued so as not to generate working torque, said torque ($T_m$) generated by said engine being constant and due solely to internal friction torques of said engine.

6. A method as claimed in claim 1, in which said angular acceleration ($\omega'_m$) of said drive shaft is determined from a measurement of said angular speed ($\omega_m$) of said drive shaft.

7. A method as claimed in claim 1, characterized in that an updating index of said transmissibility function is calculated by means of filtering of said index of degradation.

8. A method as claimed in claim 1, characterized in that a plurality of degradation indices are calculated during various gear changes and in that an updating index of said transmissibility function is calculated by means of statistical processing of said plurality of degradation indices.

9. A method as claimed in claim 7, characterized in that said transmissibility function ($T_{cf}(x)$) is updated using said updating index.

* * * * *